United States Patent
Iyer et al.

(10) Patent No.: US 9,667,512 B2
(45) Date of Patent: May 30, 2017

(54) PROVIDING AND RESOLVING AN IP ADDRESS FOR SWARM-BASED SERVICES

(71) Applicant: Aruba Networks, Inc., Sunnyvale, CA (US)

(72) Inventors: Pradeep Iyer, Cupertino, CA (US); Santashil Palchaudhuri, Kolkata (IN)

(73) Assignee: Aruba Networks, Inc., Sunnyvale, CA (US)

( * ) Notice: Subject to any disclaimer, the term of this patent is extended or adjusted under 35 U.S.C. 154(b) by 498 days.

(21) Appl. No.: 13/908,987

(22) Filed: Jun. 3, 2013

(65) Prior Publication Data

US 2013/0268660 A1   Oct. 10, 2013

Related U.S. Application Data

(62) Division of application No. 12/976,708, filed on Dec. 22, 2010, now abandoned.

(51) Int. Cl.
| | |
|---|---|
| *G06F 15/16* | (2006.01) |
| *H04W 48/08* | (2009.01) |
| *H04L 12/24* | (2006.01) |
| *H04W 4/08* | (2009.01) |
| *H04W 4/06* | (2009.01) |
| *H04W 80/04* | (2009.01) |

(52) U.S. Cl.
CPC .......... *H04L 41/5058* (2013.01); *H04W 4/08* (2013.01); *H04W 4/06* (2013.01); *H04W 80/04* (2013.01)

(58) Field of Classification Search
CPC ...... G06F 11/00; H04L 41/5058; H04W 4/06; H04W 4/08; H04W 80/04

USPC ......................................................... 709/202
See application file for complete search history.

(56) References Cited

U.S. PATENT DOCUMENTS

| | | | |
|---|---|---|---|
| 6,175,860 B1 | 1/2001 | Gaucher | |
| 7,287,180 B1 * | 10/2007 | Chen et al. | .................... 714/4.3 |
| 7,620,723 B2 | 11/2009 | Chen et al. | |
| 7,630,033 B2 | 12/2009 | Ong | |
| 8,023,468 B2 * | 9/2011 | Liu | ........................ H04W 48/12 370/331 |
| 8,599,719 B1 * | 12/2013 | Doherty | ................ H04W 8/005 370/254 |
| 2003/0050837 A1 * | 3/2003 | Kim | .................... G06Q 30/0222 705/14.23 |

(Continued)

OTHER PUBLICATIONS

U.S. Appl. No. 12/976,708 Non-Final Office Action, mailed Nov. 7, 2012.

*Primary Examiner* — Khaled Kassim
*Assistant Examiner* — Berhanu Belete
(74) *Attorney, Agent, or Firm* — Brooks, Cameron & Huebsch, PLLC

(57) ABSTRACT

According to one embodiment of the disclosure, a non-transitory computer readable medium (CRM) comprising instructions, which when executed by one or more hardware processors, causes performance of operations comprising: listening, by a first digital device in a group of digital devices, for any advertisement for a particular service; responsive to the first digital device not receiving any advertisement for the particular service for a predetermined period of time: transmitting, by the first digital device, a first advertisement for the particular service; and providing, by the first digital device, the particular service.

20 Claims, 1 Drawing Sheet

(56) References Cited

U.S. PATENT DOCUMENTS

| | | | |
|---|---|---|---|
| 2003/0092425 A1* | 5/2003 | Okazaki | H04L 63/0823 455/411 |
| 2003/0149794 A1* | 8/2003 | Morris | H04W 92/02 709/249 |
| 2004/0039817 A1 | 2/2004 | Lee et al. | |
| 2004/0203762 A1 | 10/2004 | Liu et al. | |
| 2006/0073832 A1 | 4/2006 | Pfister | |
| 2006/0089138 A1* | 4/2006 | Smith | H04W 52/0229 455/426.1 |
| 2007/0140163 A1* | 6/2007 | Meier | H04W 8/005 370/329 |
| 2007/0174661 A1* | 7/2007 | Peddada | 714/4 |
| 2008/0020758 A1 | 1/2008 | Nagarajan et al. | |
| 2008/0075051 A1 | 3/2008 | Dundar et al. | |
| 2008/0320108 A1 | 12/2008 | Murty et al. | |
| 2009/0052429 A1* | 2/2009 | Pratt, Jr. | G01D 21/00 370/350 |
| 2009/0138751 A1* | 5/2009 | Moore et al. | 714/4 |
| 2009/0170472 A1 | 7/2009 | Chapin et al. | |
| 2009/0276531 A1 | 11/2009 | Myka et al. | |
| 2010/0067428 A1* | 3/2010 | Cordeiro | H04W 48/08 370/315 |
| 2010/0074238 A1 | 3/2010 | Qian et al. | |
| 2010/0115272 A1* | 5/2010 | Batta | H04L 45/00 713/162 |
| 2010/0303051 A1 | 12/2010 | Umeuchi et al. | |
| 2011/0153773 A1* | 6/2011 | Vandwalle | H04W 8/005 709/217 |
| 2011/0153818 A1* | 6/2011 | Vandwalle | H04L 67/16 709/224 |
| 2011/0237246 A1 | 9/2011 | Sen | |
| 2012/0076045 A1 | 3/2012 | Pease et al. | |
| 2012/0150819 A1* | 6/2012 | Lindahl | G06F 17/30536 707/687 |
| 2012/0166515 A1 | 6/2012 | Iyer et al. | |
| 2012/0200688 A1 | 8/2012 | Endo et al. | |

* cited by examiner

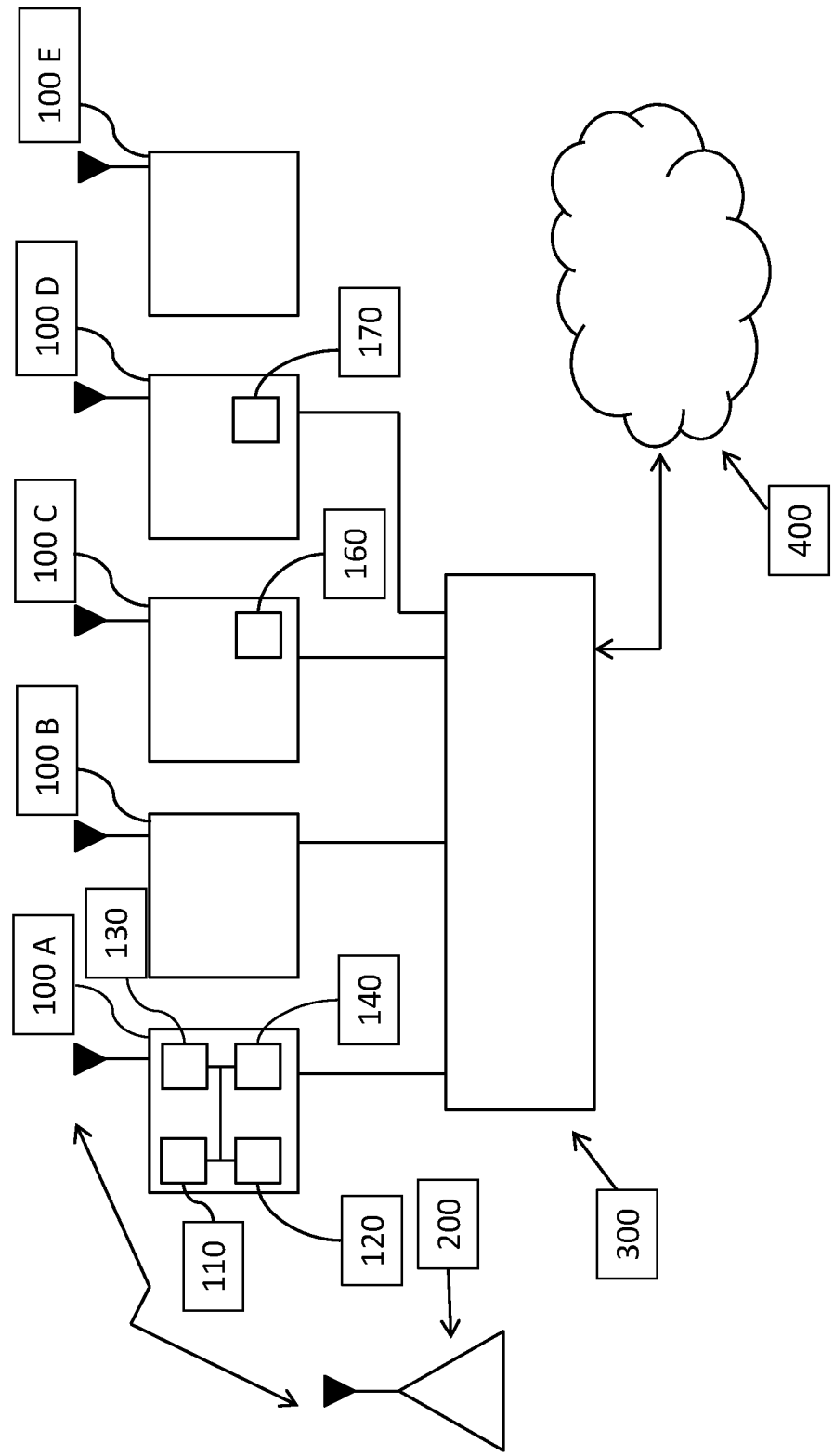

PROVIDING AND RESOLVING AN IP ADDRESS FOR SWARM-BASED SERVICES

CROSS-REFERENCE TO RELATED APPLICATIONS

This application is a divisional of U.S. application Ser. No. 12/976,708 filed on Dec. 22, 2010, and is related to U.S. patent application Ser. No. 12/976,722, entitled "Provisioning a Swarm" filed on Dec. 22, 2010, by Pradeep Iyer and Santashil PalChaudhuri, the disclosure of which is specifically incorporated herein by reference. The applicant hereby rescinds any disclaimer of claim scope in the parent application or the prosecution history thereof and advise the USPTO that the claims in this application may be broader than any claim in the parent application.

BACKGROUND OF THE INVENTION

The present invention relates to digital networks, and in particular, to the problem of providing known IP addresses for services provided by a swarm of wireless access points.

As used herein, a swarm is defined as a set of cooperating digital devices communicating over a digital network. One example of a swarm is a group of wireless access points (AP) providing wireless services to clients. Other examples of swarms are clusters of computers operating as a render farm, or other distributed computing tasks.

The composition of the swarm may change dynamically. As an example, access points may be added dynamically to a swarm, or may be removed from service.

An important aspect of a swarm is the distribution of services across swarm members. As an example, in a swarm of wireless access points, aspects of the functionality normally provided by a separate controller such as administration and configuration may be distributed over members of the swarm. And while this functionality may be hosted by any member of the swarm, there may still be a need to provide access to these services, such as by providing fixed IP addresses. In that way, clients may use the services without needing to know which member of the swarm is hosting the service.

What is needed is a way to provide and maintain addresses for services provided by members of the swarm.

BRIEF DESCRIPTION OF THE DRAWINGS

The invention may be best understood by referring to the following description and accompanying drawings that are used to illustrate embodiments of the invention in which:

The FIGURE shows devices in a network operating as a swarm.

DETAILED DESCRIPTION

Embodiments of the invention relate to methods of providing and maintaining addresses for services provided by a swarm.

According to the present invention, a swarm is a group of digital devices connected to a digital network and operating in a cooperative manner. An example of a swarm is a group of wireless access points providing wireless services to clients. One or more services may be distributed over members of the swarm. While members of the swarm typically do not have fixed IP addresses, fixed addresses may be provided for swarm services. Each service on the swarm has a master, and is hosted on one member of the swarm. The master broadcasts a periodic heartbeat, advertising its service and the address of the host member. If a swarm member fails to hear a particular service's heartbeat for a predetermined interval, it broadcasts a message announcing its intent to be master for the service. If the swarm member does not receive any other broadcasts from members indenting to take the role of master for the service, it takes over the role of master for the service and begins broadcasting periodic heartbeats identifying itself as the service master. If multiple swam members broadcast their intent to become master of the same service, a resolution protocol is invoked and one swarm member is selected to be master.

In operation, each member of the swarm maintains a table of services and the address of the swarm member hosting the service; this information is obtained from the periodic heartbeats broadcast by each service master. When a swarm member receives a service request, the request is either redirected to the service master, or the request is terminated at the swarm member and handled.

The FIGURE shows a network in which a swarm comprises a plurality of access points. Access points (APs) 100a-100e are purpose-made digital devices, each containing a processor 110, memory hierarchy 120, and input-output interfaces 130. In one embodiment of the invention, a MIPS-class processor such as those from Cavium or RMI is used. Other suitable processors, such as those from Acorn, Intel, or AMD may also be used. The memory hierarchy 120 traditionally comprises fast read/write memory for holding processor data and instructions while operating, and non-volatile memory such as EEPROM and/or Flash for storing files and system startup information. Wired interfaces 140 are typically IEEE 802.3 Ethernet interfaces, used for wired connections to other network devices such as switches, or to a controller. Wireless interfaces 130 may be WiMAX, 3G, 4G, and/or IEEE 802.11 wireless interfaces. In one embodiment of the invention, APs operate under control of a LINUX operating system. APs 100 may connect to a switch 300 which provides access to network 400. It should be noted that switch 300 does not have the capabilities of a controller, but only provides L2/L3 switching.

Wireless client 200 has a similar architecture, chiefly differing in input/output devices; a laptop computer will usually contain a large LCD, while a handheld wireless scanner will typically have a much smaller display, but contain a laser barcode scanner.

While the present invention is described in terms of a swarm comprising a plurality of access points providing wireless services to clients, the invention is equally applicable to swarms of other digital devices communicating on a network.

According to the present invention, a swarm is a group of digital devices connected to a network and operating cooperatively. As shown in the FIGURE, APs 100a-100e form a swarm, with APs 100a-100d having wired connections to switch 300, and AP 100e having only wireless connections to the other members 100a-100d of the swarm. Note that the network supporting the swarm may be a wired network, a wireless network, or a combination. In a preferred embodiment, the wireless network is an IEEE 802.11 Wireless network. In the example of the FIGURE, switch 300 provides access to network 400.

An important aspect of a swarm is the distribution of services over the swarm. In the example of a swarm of wireless access points (APs), such as shown in the FIGURE, aspects of controller functionality normally required to operate such a group of APs may be hosted on one or more members of the swarm. Each service is hosted on one member of the swarm.

According to the present invention the service master broadcasts a heartbeat periodically. In one embodiment of the invention, this heartbeat identifies the service, and the IP address of the swarm member hosting the service.

Other swarm members monitor the service heartbeat. If a swarm member does not receive a service heartbeat in a predetermined period, the swarm member broadcasts a message to all other swarm members indicating that the swarm member intends to be the master for that particular service. If the swarm member does not receive any other broadcasts of intent to be that service's master, the swarm member takes on the role of service master and begins broadcasting the periodic heartbeats. This process covers the cases of service startup when no previous master exists, and service recovery when the service master fails.

Note that not all swarm members may serve as masters for all services. As an example, in a swarm of access points, the design decision may be made not to permit mesh nodes, those nodes without wired Ethernet connections such as AP 100e, to become masters for certain services. Swarm elements not possessing cryptographic hardware may not be suitable for hosting certain authentication functions, and so on. Similarly, a swarm element already acting as master for one service may be configured to not offer its services as master for another service.

Similarly, some swarm members may be favored to host services. A device with larger memory capacity or a faster processor may be favored to host some services. In one embodiment of the invention, swarm members may be divided into classes according to their suitability as masters for a particular service. Those with a higher degree of suitability will have a shorter preset time limit before broadcasting the intent to be master. As an example, assume a particular service master sends out a heartbeat every second. Assume there are three classes of swarm members, with those having the highest degree of suitability for operating as master waiting five seconds before broadcasting intent to be master, those in the middle class waiting six seconds, and those in the lower class waiting seven seconds before broadcasting intent to be master.

In the event that multiple swarm members broadcast the intent to be master, a resolution protocol must be employed. The resolution protocol for the service must be the same on all swarm members, so that each member of the swarm can apply the protocol and arrive at the same decision as to which member will be master.

Many different protocols may be used, as long as they are used uniformly for the service over all members of the swarm. Examples include choosing the master based on the identification of the swarm member, such as MAC address or IP address. As examples, high or low values may be chosen as master. Information relating to the operating history of the swarm member, such as uptime may also be used, but this requires that the information needed for the resolution protocol be included in the broadcast intent to be master message.

Depending on the service, once a master has been selected, the master may need to populate data structures with information from other swarm members. In one embodiment of the invention, when a non-master swarm member detects that a new master has been selected for a service, the swarm member sends complete datasets to the new master. Once the master has been provided with complete datasets, only changes need be sent as needed. As an example, in the case of a swarm of access points and a service providing administrative functions, when a swarm member detects a new master has been established for this service, the swarm member sends the master complete tables describing all the wireless clients connected to the access point. Once complete tables have been provided to the master, the swarm member need only send changes to the master.

As an example, assume that during swarm startup, AP 100c is first to advertise 150 itself as a service master for a service. AP 100c starts service process 160. AP 100c begins broadcasting periodic heartbeats for service 160. If AP 100c fails, the heartbeat for service 160 from AP 100c ceases. This causes the remaining APs to once again select a new master, such as AP 100d starting new service process 170. Now AP 100d begins broadcasting periodic heartbeats 155 for service 170.

A client such as wireless client 200 is associated with a particular AP member of the swarm. As shown in the FIGURE, client 200 is associated with AP 100a. When client 200 wishes to use a swarm service, it does that through the fixed address for that service. A request from client 200 is received by AP 100a member of the swarm. AP 100a uses the table of service addresses which it maintains from received heartbeats. If the AP cannot process the request itself, the request is redirected to the swarm member hosting the service, such as AP 100d for service 170.

The present invention may be realized in hardware, software, or a combination of hardware and software. The present invention may be realized in a centralized fashion in one computer system such as AP 100a, or in a distributed fashion where different elements are spread across several interconnected computer systems. A typical combination of hardware and software may be an access point with a computer program that, when being loaded and executed, controls the device such that it carries out the methods described herein.

The present invention also may be embedded in nontransitory fashion in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

We claim:

1. A non-transitory Computer Readable Medium (CRM) comprising instructions, which when executed by one or more hardware processors, causes performance of operations comprising:

listening for a predetermined period of time, by a first digital device in a group of digital devices, for an advertisement for a particular service, wherein the group of digital devices are divided into classes based on capabilities of each of the digital devices to provide the particular service, and the predetermined period of time for the first digital device is set in accordance with one of the classes comprising the first digital device; and responsive to the first digital device not receiving the advertisement for the particular service for the predetermined period of time:
  transmitting, by the first digital device, a first advertisement for the particular service; and
  providing, by the first digital device, the particular service; and
wherein listening for the advertisement for the particular service comprises listening for the advertisement for an authentication service, and
wherein transmitting the first advertisement responsive to not receiving the advertisement comprises transmitting the first advertisement for the authentication service in response to not receiving the advertisement for the authentication service.

2. The CRM of claim 1,
wherein listening for the advertisement for the particular service comprises listening for the advertisement for a configuration service, and
wherein transmitting the first advertisement responsive to not receiving the advertisement comprises transmitting the first advertisement for the configuration service in response to not receiving the advertisement for the configuration service.

3. The CRM of claim 1, wherein the first advertisement for the particular service transmitted by the first digital device comprises an IP address associated with the particular service, wherein the operations further comprise:
  subsequent to the first digital device providing the particular service, a second digital device transmitting a second advertisement for the particular service, and wherein the second advertisement comprises the IP address associated with the particular service.

4. The CRM of claim 1, wherein the first advertisement for the particular service transmitted by the first digital device comprises an IP address associated with the particular service, wherein the operations further comprise:
  subsequent to the first digital device providing the service:
    ceasing, by the first digital device, to transmit the first advertisement for the particular service;
    listening, by a second digital device in the group of digital devices, for another advertisement for the particular service;
    responsive to the second digital device not receiving the another advertisement for the particular service for a second predetermined period of time:
      transmitting, by the second digital device, a second advertisement for the particular service, wherein the second advertisement comprises the IP address associated with the particular service;
      providing, by the second digital device, the particular service.

5. The CRM of claim 1, wherein the first digital device transmitting the advertisement for the particular service is further responsive to:
  transmitting, by the first digital device, a message indicating an intent to provide the particular service; and
  determining, by the first digital device, that no message was received from any other digital device in the group of digital devices that indicates the intent to provide the particular service.

6. The CRM of claim 1, wherein the first digital device is an access point, and wherein the access point provides the particular service to a client device.

7. The CRM of claim 1, wherein the particular service is provided by the first digital device to other digital devices in the group of digital devices.

8. A non-transitory Computer Readable Medium (CRM) comprising instructions, which when executed by one or more hardware processors, causes performance of operations comprising:
  listening for a predetermined period of time, by a first digital device in a group of digital devices, for an advertisement for a particular service, wherein the group of digital devices are divided into classes based on capabilities of each of the digital devices to provide the particular service, and the predetermined period of time for the first digital device is set in accordance with one of the classes comprising the first digital device; and
  responsive to the first digital device not receiving the advertisement for the particular service for the predetermined period of time:
    transmitting, by the first digital device in the group of digital devices, a first advertisement for the particular service, the first advertisement comprising an IP address associated with the particular service, the IP address being used by the first digital device as a source address in the first advertisement;
    subsequent to the first digital device providing the particular service:
      transmitting, by a second digital device in the group of digital devices, a second advertisement for the particular service, the second advertisement comprising the IP address associated with the particular service, the IP address being used by the second digital device as a source address in the second advertisement,
  wherein listening for the advertisement for the particular service comprises listening for the advertisement for an authentication service, and
  wherein transmitting the first advertisement responsive to not receiving the advertisement comprises transmitting the first advertisement for the authentication service in response to not receiving the advertisement for the authentication service.

9. The CRM of claim 8, wherein the IP address associated with the particular service is used concurrently as an identifier by two or more digital devices in the group of digital devices.

10. The CRM of claim 8, wherein the IP address associated with the particular service is used during different time periods as an identifier by two or more digital devices in the group of digital devices.

11. A system comprising:
  a first digital device comprising a hardware processor, the first digital device comprised in one of a plurality of classes of digital devices based on capabilities of the first digital device to provide a particular service, wherein the first digital device is configured to listen for advertisements for a predetermined period of time based on the class comprising the first digital device,
  wherein the first digital device is configured to perform operations comprising:
    listening for an advertisement for a particular service;
    responsive to not receiving the advertisement for the particular service for the predetermined period of time:

transmitting a first advertisement for the particular service; and
providing the particular service,
wherein listening for the advertisement for the particular service comprises listening for the advertisement for an authentication service, and
wherein transmitting the first advertisement responsive to not receiving the advertisement comprises transmitting the first advertisement for the authentication service in response to not receiving the advertisement for the authentication service.

12. The system of claim 11,
wherein listening for the advertisement for the particular service comprises listening for the advertisement for a configuration service, and
wherein transmitting the first advertisement responsive to not receiving the advertisement comprises transmitting the first advertisement for the configuration service in response to not receiving the advertisement for the configuration service.

13. The system of claim 11, wherein the first advertisement for the particular service transmitted by the first digital device comprises an IP address associated with the particular service, wherein the system further comprises a second digital device, wherein subsequent to the first digital device providing the particular service, the second digital device is configured for transmitting a second advertisement for the particular service, and wherein the second advertisement comprises the IP address associated with the particular service.

14. The system of claim 11, wherein the first advertisement for the particular service transmitted by the first digital device comprises an IP address associated with the particular service, wherein the system further comprises:
a second digital device, wherein the first digital device ceases to transmit advertisements for the particular service after providing the particular service;
wherein the second digital device is configured for:
subsequent to the first digital device ceasing to transmit advertisements for the particular service:
listening for the advertisement for the particular service;
responsive to the second digital device not receiving the advertisement for the particular service for a second predetermined period of time;
transmitting a second advertisement for the particular service, wherein the second advertisement comprises the IP address associated with the service; and
providing, by the second digital device, the particular service.

15. The system of claim 11, wherein the first digital device transmitting the advertisement for the service is further responsive to:

transmitting, by the first digital device, a message indicating an intent to provide the particular service; and
determining, by the first digital device, that no message was received from any other digital device in the group of digital devices that indicates the intent to provide the particular service.

16. The system of claim 11, wherein the first digital device is an access point, and wherein the access point provides the particular service to a client device.

17. The system of claim 11, wherein the particular service is provided by the first digital device to other digital devices in the group of digital devices.

18. A system comprising:
a first digital device and a second digital device, each digital device comprising a hardware processor, the first digital device and the second digital device comprised in a group of digital devices divided into classes based on capabilities of the digital devices to provide a particular service,
wherein the first digital device is configured to perform:
transmission of a first advertisement for a particular service, the first advertisement comprising an IP address associated with the particular service, the IP address being used by the first digital device as a source address in the first advertisement;
providing of the particular service, and
wherein subsequent to the first digital device providing the particular service, the second digital device is configured to perform:
transmission of a second advertisement for the particular service, the second advertisement comprising the IP address associated with the particular service, the IP address being used by the second digital device as a source address in the second advertisement; and
providing of the particular service,
wherein transmitting the first advertisement comprises transmitting a first advertisement for an authentication service in response to not receiving an advertisement for the authentication service.

19. The system of claim 18, wherein the IP address associated with the particular service is used concurrently as an identifier by two or more digital devices in the group of digital devices comprising the first digital device and the second digital device.

20. The system of claim 18, wherein the IP address associated with the particular service is used during different time periods as an identifier by two or more digital devices in the group of digital devices comprising the first digital device and the second digital device.

* * * * *